April 4, 1939.  J. BJORKSTEN  2,153,324
DUPLICATING PAD OR ROLL AND METHOD FOR ITS USE
Filed May 23, 1938
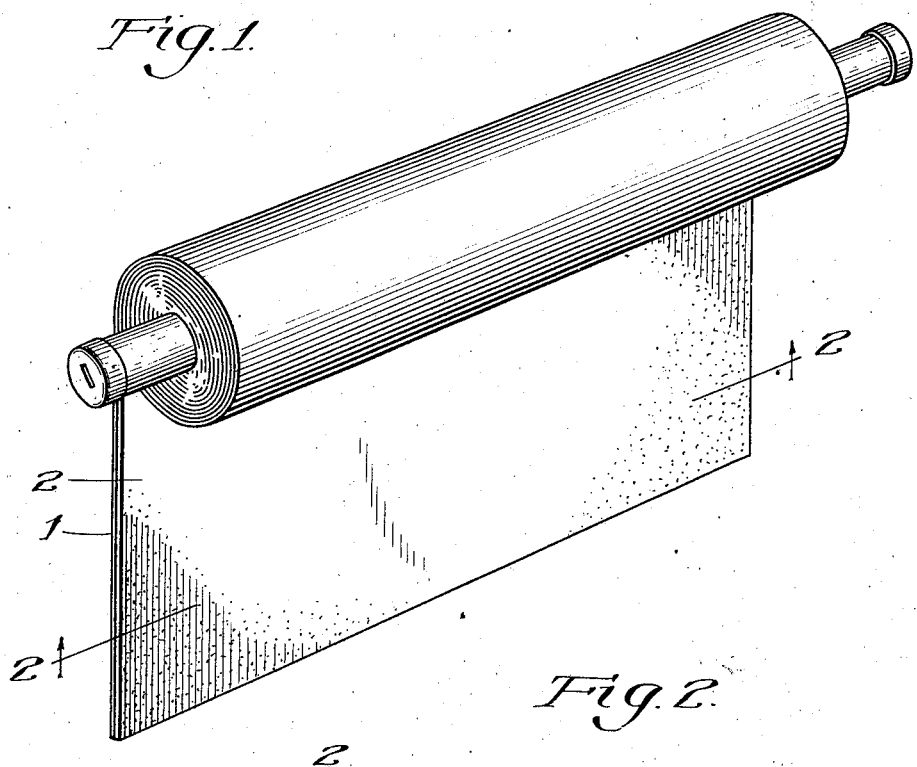
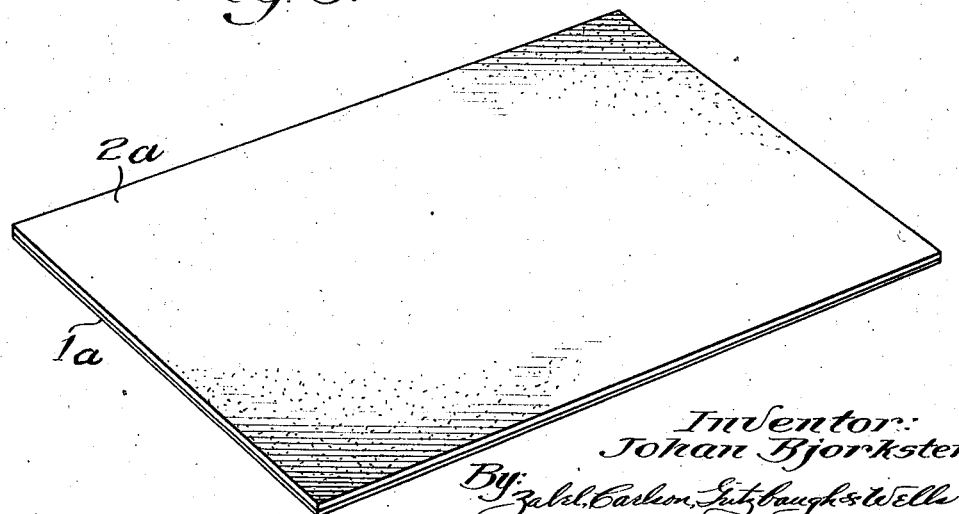

Patented Apr. 4, 1939

2,153,324

UNITED STATES PATENT OFFICE 2,153,324

DUPLICATING PAD OR ROLL AND METHOD FOR ITS USE

Johan Bjorksten, Chicago, Ill., assignor to Ditto, Incorporated, Chicago, Ill., a corporation of West Virginia Application May 23, 1938, Serial No. 209,498

7 Claims. (Cl. 41—31.6)

This invention relates to a duplicating pad or roll and to a method of duplicating and particularly to a hectograph pad or roll and a method of hectograph duplicating.

More particularly this invention is directed to the production and use of pads or rolls having a duplicating surface of a composition comprising an acrylate resin.

An object of the invention is to provice a duplicating composition which will remain flexible, resilient and ink-absorbent over an extended period of time.

Another object is to provide a duplicating composition which does not require storage before marketing.

Other objects and advantages of this invention will become apparent as the following detailed description progresses, reference being made to the accompanying drawing, in which Fig. 1 is a perspective view of a duplicating roll embodying the invention.

Fig. 2 is a section taken along line 2—2 of Fig. 1.

Fig. 3 is a perspective view of a duplicating pad embodying the invention.

Referring to Figs. 1 and 2, the reference character 1 designates a backing of a flexible, strong sheet material, such as cotton, covered with a hectograph duplicating composition 2 comprising an acrylate resin.

In Fig. 3, the backing is shown at 1a and the hectograph mass is shown at 2a.

A preferred embodiment of the invention is a flexible, strong sheet material covered with a film of a solid polymerized acrylic acid ester containing a water and alcohol soluble plasticizer of such character and in such amount as to make the composition flexible, resilient and highly absorbent, but not in such amount as to make the composition so weak that it will break or tear during normal commercial use.

Acrylate resins suitable for this process may be prepared by polymerization of acrylic acid and its derivatives by heating them in the presence of suitable catalysts, such as oxygen or organic peroxides. A great number of processes are known to the art, and any of these methods can be adapted to preparation of the acrylate materials contemplated in this invention.

When acrylic acid and its derivatives are being polymerized, the condensation process proceeds gradually. By interrupting the process after different lengths of time, acrylate resins of different degrees of polymerization may be obtained. A method for such control of the degree of polymerization of the finished product is for example disclosed in the British Patent 374,436 (1931) to Rohm and Haas A-G. This method permits convenient control of the degree of polymerization obtainable, even in large-scale operation.

The suitability of acrylate resins for the present process depends on their softness or plasticity, which in turn is governed partly by the degree of polymerization, and partly by the chemical character of the acrylate or methacrylate derivatives involved. So, for example, are acrylate derivatives in general softer and more plastic than the corresponding methacrylate derivatives. The presence of long aliphatic side chains also tends to increase softness and plasticity. This is further influenced by the nature of the solvent present during the polymerization process, and by the concentration thereof, and also by the temperature during the polymerization.

It is thus apparent that so many factors influence the properties of the polymerization product, that it would be very difficult to state any general rules. If the acrylate or methacrylate polymer is too low, it is an oil, or too soft for the application now contemplated, and if it is too high it will be equally unsuitable because of failure to hold the necessary quantities of plasticizer.

To obtain an acrylate or methacrylate polymer of suitable characteristics from the different raw materials possible, it is therefore necessary to take out and test samples during the polymerization reaction, and thus to determine at what point the polymerization should be interrupted at any particular set of conditions. A suitable procedure is indicated by the British Patent 374,436 (1931) to Rohm and Haas A-G. The polymerization is carried out in an emulsion of the acrylate material in water with sulphonated castor oil as emulsifying agent. The material is heated in a closed vessel with 1% of a perioxide catalyst. At any time of the reaction, samples may be taken out, and the reaction in these samples terminated by the addition of cold water. The samples thus obtained may be tested for suitability for use in connection with the present invention by:

I. Dissolving them in five times their weight of ethyl acetate, adding twice their own weight of glycerine, evaporating the ethyl acetate, and testing the resultant composition for properties as a duplicating composition, by methods known to the art.

II. By leaving the sample resin over night in contact with one-half to four times its weight of dimethoxy tetra glycol, and testing the resultant composition for duplicating properties.

Once the optimum time of polymerization has been established for a given acrylate or methacrylate material or reaction mixture, it is easy to manufacture a larger quantity of polymer of the desired qualities.

In the above instances the materials of desired properties were obtained by starting from unpolymerized material, and arresting the polymerization process at the point where a material of desired properties was obtained.

Obviously, materials of similar properties may be obtained by starting from highly polymerized materials and de-polymerizing these, for example, by saponification, until polymers of the desired properties have been arrived at. Suitable methods for stepwise controlled saponification of acrylate or methacrylate resins are disclosed in the British Patent 470,867 to the Rohm and Haas Company.

In order that the invention may be more clearly understood the following specific examples are given wherein the proportion and parts set out are all by weight:

*Example I*

| | Parts |
|---|---|
| A 10% solution of polymerized acrylate ester in ethyl acetate, sold by the Resinous Products Co., under the trade name of Acryloid C-10 | 10 |
| Glycerin | 2 |
| Water | ½ |

The composition is spread out on the backing sheet and the volatile solvent (ethyl acetate) is allowed to evaporate.

*Example II*

| | Parts |
|---|---|
| A 10% solution of polymerized acrylate ester in ethylene dichloride, sold by the Rohm and Haas Co. under the trade name of Acryloid B-7 | 10 |
| Glycerin | 1 |
| Water | 0.1 |

*Example III*

| | Parts |
|---|---|
| A 10% solution of polymerized acrylate ester in ethyl acetate, sold by the Resinous Products Co. under the trade name of Acryloid C-10 | 10 |
| Butyl carbitol | 3 |
| Water | ½ |

*Example IV*

| | Parts |
|---|---|
| The solid acrylate resin obtained by evaporation of the above named solution "Acryloid C-10" | 7 |
| Dimethoxy tetra glycol | 1 |

It is to be understood, of course, that the foregoing examples are merely illustrative and that the invention is to be in nowise limited thereby, since obviously various proportions and ingredients employed may be resorted to without departure from the spirit of the invention.

In general, the plasticizer is used in amounts of one half to two and one half times the weight of the solid acrylate or methacrylate resin, and the water in amounts of 0 to 35% of the plasticizer. However, variations are permissible to suit specific conditions, and depending on the molecular weight and character of the resin employed. Generally, the lower molecular resins are capable of holding a higher percentage of plasticizer than the more high molecular polymers, and the resins of the acrylate series more than those of the methacrylate series.

In the manufacture of duplicating pads or rolls, the compositions of the examples are coated on a flexible strong backing such as cotton cloth. On evaporation of the volatile solvent a thin, tough, resilient and highly ink absorbent duplicating film is left secured to the backing.

The resulting duplicating pad or roll is used for making copies according to the ordinary hectograph process substantially as follows: A design formed by water or alcohol soluble dye is applied to a copy sheet. The design on the copy sheet in then contacted with the duplicating composition, whereupon the design in reverse is transferred to the composition. Copies are then made by contacting the design of the duplicating mass with copy sheets.

While there has been shown and described certain embodiments of the invention, it is to be understood that it is capable of many modifications. Changes, therefore, in the construction and arrangement may be made without departing from the spirit and scope of the invention as disclosed in the appended claims, in which it is the intention to claim all novelty inherent in the invention as broadly as permissible, in view of the prior art.

I claim:

1. A duplicating pad or roll comprising an acrylate resin.

2. A duplicating pad or roll comprising a backing covered with a tough resilient duplicating composition comprising an acrylate resin.

3. A duplicating pad or roll comprising an acrylate resin containing a water and alcohol soluble plasticizer.

4. A duplicating roll or pad comprising a duplicating composition containing an acrylate resin and glycerin.

5. A duplicating roll or pad comprising a duplicating composition containing an acrylate resin and butyl carbitol.

6. A duplicating roll or pad comprising a duplicating composition containing an acrylate resin and dimethoxy tetra glycol.

7. A process of reproducing copies which comprises applying a design formed by water and alcohol soluble dye to a copy sheet, contacting said design on the copy sheet with a duplicating composition comprising an acrylate resin, whereupon the design of the copy sheet is transferred in reverse to the duplicating composition, and contacting said design on the duplicating composition with copies to reproduce the design on the copies in positive.

JOHAN BJORKSTEN.